US012375321B2

(12) United States Patent
He et al.

(10) Patent No.: US 12,375,321 B2
(45) Date of Patent: Jul. 29, 2025

(54) METHOD AND SYSTEM FOR ETHERNET VIRTUAL PRIVATE NETWORK (EVPN) SPLIT-HORIZON FILTERING

(71) Applicant: Telefonaktiebolaget LM Ericsson (publ), Stockholm (SE)

(72) Inventors: Jiang He, Beijing (CN); Bolin Nie, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 483 days.

(21) Appl. No.: 17/788,202

(22) PCT Filed: Dec. 31, 2019

(86) PCT No.: PCT/CN2019/130394
§ 371 (c)(1),
(2) Date: Jun. 22, 2022

(87) PCT Pub. No.: WO2021/134434
PCT Pub. Date: Jul. 8, 2021

(65) Prior Publication Data
US 2023/0031683 A1     Feb. 2, 2023

(51) Int. Cl.
*H04L 12/46*     (2006.01)
*H04L 45/50*     (2022.01)

(52) U.S. Cl.
CPC ...... *H04L 12/4645* (2013.01); *H04L 12/4633* (2013.01); *H04L 45/50* (2013.01)

(58) Field of Classification Search
CPC .. H04L 12/4645; H04L 12/4633; H04L 45/50
See application file for complete search history.

(56) References Cited

U.S. PATENT DOCUMENTS 10,142,129 B1 *  11/2018  Gupta ...................... H04L 45/66
10,841,216 B1 *  11/2020  Hoang .................. H04L 12/465
(Continued)

FOREIGN PATENT DOCUMENTS

| CN | 104135420 A | 11/2014 |
| CN | 107135133 A | 9/2017 |

(Continued)

OTHER PUBLICATIONS

Aggarwal et al., "BGP Encodings and Procedures for Multicast in MPLS/BGP IP VPNs", Internet Engineering Task Force (IETF), Request for Comments: 6514, Feb. 2012, pp. 1-59.
(Continued)

*Primary Examiner* — Raj Jain
(74) *Attorney, Agent, or Firm* — NICHOLSON DE VOS WEBSTER & ELLIOTT LLP

(57) ABSTRACT

Embodiments of the disclosed techniques include methods, apparatus, and instructions for split-horizon filtering in an Ethernet virtual private network (EVPN), where an EVPN instance includes a plurality of provider edges (PEs) that forward traffic for a plurality of customer edges (CEs). In one embodiment, a method includes advertising a set of single Broadcast, Unknown unicast, or Multicast (BUM) identifiers, each in an Inclusive Multicast Ethernet tag (IMET) route from a PE of the EVPN instance to one other PE within the plurality of PEs, where each PE that shares an Ethernet segment with the PE is advertised with one unique BUM identifier to distinguish BUM packets from that PE with BUM packets from other PEs of the EVPN instance; and forwarding by the PE, BUM packets from another PE of the EVPN instance to one or more CEs coupled to the PE based on a single BUM identifier encapsulated within the BUM packets.

20 Claims, 7 Drawing Sheets

(56) References Cited

U.S. PATENT DOCUMENTS

| | | | | |
|---|---|---|---|---|
| 2018/0287946 A1* | 10/2018 | Nagarajan | ............ | H04L 12/1877 |
| 2019/0007309 A1* | 1/2019 | Arora | ....................... | H04L 45/16 |
| 2019/0222431 A1* | 7/2019 | Gao | .................... | H04L 12/4633 |
| 2020/0021523 A1* | 1/2020 | Wang | .................. | H04L 12/4633 |
| 2023/0031683 A1* | 2/2023 | He | ..................... | H04L 12/4633 |
| 2024/0372804 A1* | 11/2024 | Bandekar | ................ | H04L 45/66 |

FOREIGN PATENT DOCUMENTS

| | | |
|---|---|---|
| WO | 2015/165311 A1 | 11/2015 |
| WO | 2019/119220 A1 | 6/2019 |
| WO | 2019/167703 A1 | 9/2019 |

OTHER PUBLICATIONS

Sajassi et al., "A Network Virtualization Overlay Solution Using Ethernet VPN (EVPN)", Internet Engineering Task Force (IETF), Request for Comments: 8365, Mar. 2018, pp. 1-33.

Sajassi et al., "BGP MPLS-Based Ethernet VPN", Internet Engineering Task Force (IETF), Request for Comments: 7432, Feb. 2015, pp. 1-56.

* cited by examiner

METHOD AND SYSTEM FOR ETHERNET VIRTUAL PRIVATE NETWORK (EVPN) SPLIT-HORIZON FILTERING

CROSS-REFERENCE TO RELATED APPLICATIONS

This application is a National stage of International Application No. PCT/CN2019/130394, filed Dec. 31, 2019, which is hereby incorporated by reference.

TECHNICAL FIELD

Embodiments of the invention relate to the field of networking; and more specifically, to Ethernet Virtual Private Network (EVPN) split-horizon filtering.

BACKGROUND ART

Ethernet Virtual Private Network (EVPN) is a Border Gateway Protocol (BGP) based Virtual Private Network (VPN) technology. Multi-homing is a key feature of EVPN, and it may accommodate load balancing and achieve fast convergence in various scenarios from mobile backhaul to data center applications. When a customer edge (CE) device (or simply a CE) is multihomed to two or more provider edge (PE) devices (or simply PEs) on an Ethernet Segment (ES) operating in an All-Active mode, the CE may send a BUM (Broadcast, Unknown unicast, and Multicast) packet to one of these PEs, and the BUM packet shall not be looped back to the same CE via another PE connected to the CE. The filtering mechanism to prevent such loop and packet duplication is referred to as split-horizon filtering.

Split-horizon filtering in EVPN includes two approaches: (1) an Ethernet Segment Identifier (ESI) label-based approach for a Multiprotocol Label Switching (MPLS) based EVPN and (2) a local-bias based approach for a Virtual Extensible Local Area Network (VXLAN) and/or Network Virtualization using Generic Routing Encapsulation (NVGRE) based EVPN. Both approaches require additional logic on the forwarding plane.

In the ESI label based approach, an ingress provider edge (PE) of an EVPN needs to encapsulate an ESI to incoming BUM packets based on source port information, and the corresponding egress PE of the EVPN needs to flood the BUM packets based on values in two fields of the BUM packets: one for the ESI and the other for the MPLS label. In the local-bias based approach, the egress PE needs to flood BUM packets based on two fields of the BUM packets as well: one for the VXLAN Network Identifier (VNI) and the other for the tunnel source Internet Protocol (IP) address. Both approaches rely on dual-field operations that are not typically implemented on the forwarding plane and the existing network processors/chipsets for the forwarding plane often do not support these operations. Thus, existing network processors/chipsets have difficulty supporting EVPN multi-homing. Replacing these network processors/chipsets for EVPN multi-homing support is expensive and even impractical in some cases.

SUMMARY

Embodiments of the disclosed techniques include methods for split-horizon filtering in an Ethernet virtual private network (EVPN), where an EVPN instance includes a plurality of provider edges (PEs) that forward traffic for a plurality of customer edges (CEs). In one embodiment, a method includes advertising a set of single Broadcast, Unknown unicast, or Multicast (BUM) identifiers, each in an Inclusive Multicast Ethernet Tag (IMET) route from a PE of the EVPN instance to one other PE within the plurality of PEs, where each PE that shares an Ethernet segment with the PE is advertised with one unique BUM identifier; and forwarding by the PE, BUM packets from another PE of the EVPN instance to one or more CEs coupled to the PE based on a single BUM identifier encapsulated within the BUM packets.

Embodiments of the disclosed techniques include network devices for split-horizon filtering in an Ethernet virtual private network (EVPN), where the network devices are to serve as provider edges (PEs) of an EVPN instance including a plurality of PEs that forward traffic for a plurality of customer edges (CEs). In one embodiment, a network device comprises a processor and non-transitory computer-readable storage medium to store instructions that, when executed by the processor, cause the network device to perform one or more methods for split-horizon filtering in an EVPN. An exemplary method includes advertising a set of single Broadcast, Unknown unicast, or Multicast (BUM) identifiers, each in an Inclusive Multicast Ethernet Tag (IMET) route from a PE of the EVPN instance to one other PE within the plurality of PEs, where each PE that shares an Ethernet segment with the PE is advertised with one unique BUM identifier; and forwarding by the PE, BUM packets from another PE of the EVPN instance to one or more CEs coupled to the PE based on a single BUM identifier encapsulated within the BUM packets.

Embodiments of the disclosed techniques include non-transitory computer-readable storage media for split-horizon filtering in an Ethernet virtual private network (EVPN). In one embodiment, a non-transitory computer-readable storage medium is to store instructions that, when executed, cause a network device to perform one or more methods for split-horizon filtering in an EVPN. An exemplary method includes advertising a set of single Broadcast, Unknown unicast, or Multicast (BUM) identifiers, each in an Inclusive Multicast Ethernet Tag (IMET) route from a PE of the EVPN instance to one other PE within the plurality of PEs, where each PE that shares an Ethernet segment with the PE is advertised with one unique BUM identifier; and forwarding by the PE, BUM packets from another PE of the EVPN instance to one or more CEs coupled to the PE based on a single BUM identifier encapsulated within the BUM packets.

Embodiments of the disclosed techniques provide ways to use a single BUM identifier to forward BUM packets and avoid complex logic/modules/circuits on the forwarding plane to support EVPN multi-homing, so that the existing network processors/chipsets on the forwarding plane remain effective.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
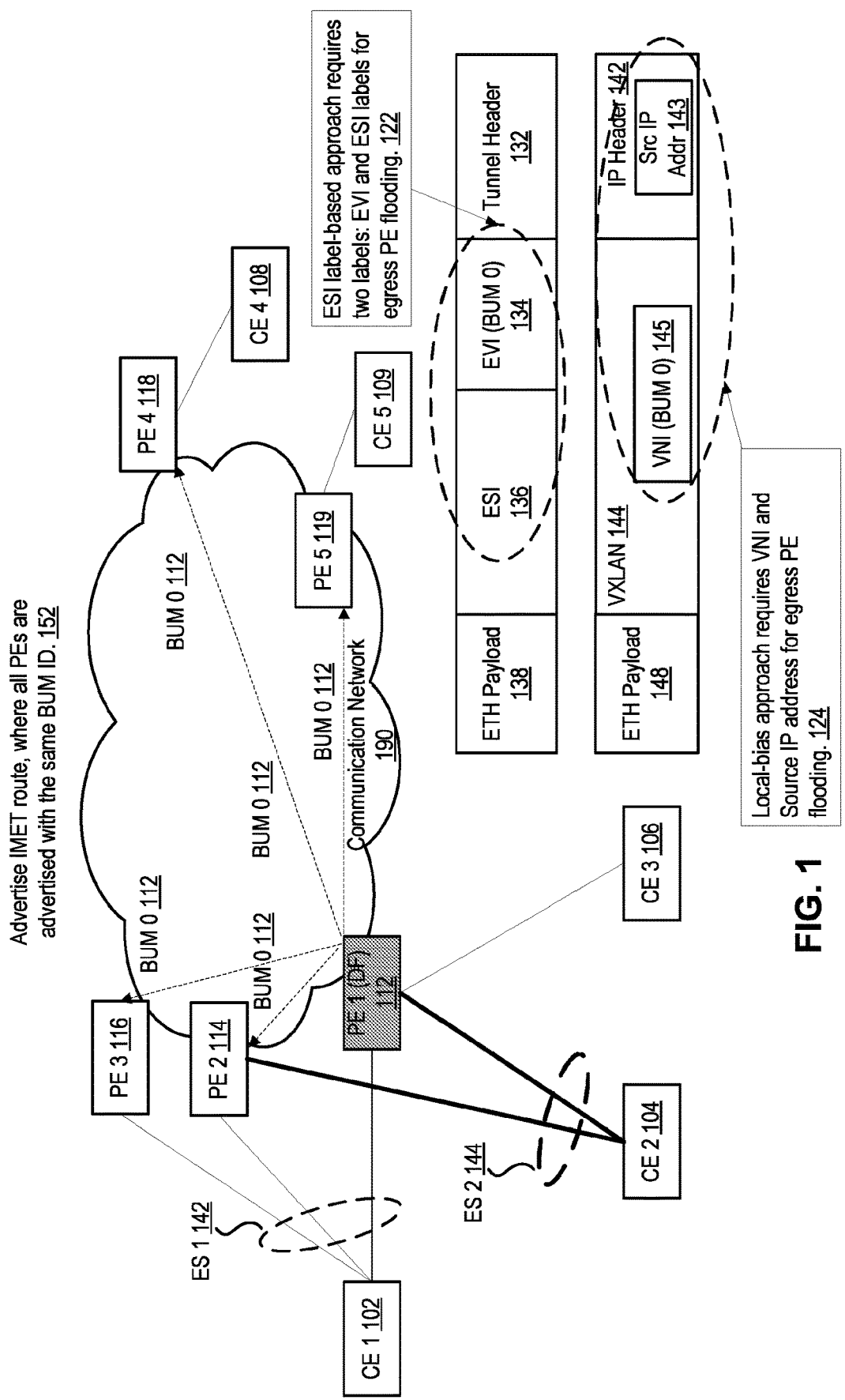
FIG. 1 shows dual-field-based BUM packet flooding.

The following description describes methods, apparatus, and instructions for split-horizon filtering in an Ethernet Virtual Private Network (EVPN). In the following description, numerous specific details such as logic implementations, resource partitioning/sharing/duplication implementations, types, and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

Terms

Ethernet Virtual Private Network (EVPN) instance (EVI): An EVI spans the provider edge (PE) devices participating in an EVPN.

Ethernet Segment (ES) and ES Identifier (ESI): When a customer site (device or network) such as a customer edge (CE) device is connected to one or more PEs via a set of Ethernet links, then that set of links is referred to as an Ethernet segment. A unique non-zero identifier that identifies an Ethernet segment is an ESI.

Virtual Extensible Local Area Network (VXLAN) is a network virtualization technology that attempts to address the scalability problems associated with large cloud computing deployments. VXLAN encapsulates Open System Interconnect (OSI) layer 2 Ethernet frames with OSI layer 4 User Datagram Protocol (UDP) datagrams. Each VXLAN segment is identified through a segment identifier (ID), VXLAN Network identifier (VNI).

Network Virtualization using Generic Routing Encapsulation (NVGRE) is a network virtualization technology that uses Generic Routing Encapsulation (GRE) to tunnel layer 2 packets over layer 3 networks.

Both VXLAN and NVGRE are examples of technologies that provide a data plane encapsulation that is used to transport a packet over the common physical IP infrastructure between Network Virtualization Edges (NVEs)—e.g., VXLAN Tunnel End Points (VTEPs) in a VXLAN network. Both of these technologies include the identifier of the specific Network Virtualization Overlay (NVO) instance, VNI in VXLAN and Virtual Subnet Identifier (VSID) in NVGRE. The term VNI is used broadly to represent both VNI and VSID in this Specification. Note that an NVE/VTEP is equivalent to a PE, as explained in the Internet Engineering Task Force (IETF) Request for Comments (RFC) 8365, entitled "A Network Virtualization Overlay Solution Using Ethernet VPN (EVPN)" and dated March 2018.

Broadcast, unknown-unicast, and multicast (BUM) packets are packets that are sent to all the PEs participating in an EVPN instance. When multiple PEs share the same Ethernet Segment (ES), only one PE, the designated forwarder (DF) for the ES, forwards the BUM packets from a core-facing network interface (e.g., coupled to another PE of the EVI) to the ES, and transmits to one or more CEs. A non-DF PE of the ES drops the BUM packets to the ES. Note that a remote PE (a PE outside of the ES) is ignorant of the DF for the ES and it may flood the BUM packets to all the other PEs of the EVPN instance, including the PEs of the ES, regardless of the DF status.

Dual Field Based BUM Packet Flooding

In EVPN, a label (sometimes referred to as an MPLS label) that identifies the forwarding route may be distributed by an egress PE via the EVPN control place. The distribution of the label may be through advertising an Inclusive Multicast Ethernet Tag (IMET) route, as explained in the IETF RFC 8365 and the IETF RFC 7432, entitled "BGP MPLS-Based Ethernet VPN" and dated February 2015. The label is then placed in the MPLS header of a BUM packet by the ingress PE. Upon receipt of the BUM packet, the label and a value extracted from another field of the BUM packets are then used by the egress PE for disposition of that packet.

FIG. 1 shows dual-field-based BUM packet flooding. The EVPN is implemented with a communication network 190, which may include one or more wireline and/or wireless networks. The communication network 190 includes PE 1 to PE 5 at references 112, 114, 116, 118, and 119, which are coupled to CE 1 to CE 5 at references 102, 104, 106, 108, and 109. An Ethernet segment ES 1 at reference 142 couples CE 1 at 102 with PE 1 to PE 3, and an Ethernet segment ES 2 at reference 144 couples CE 2 at 104 with PE 1 to PE 2. PE 1 at reference 112 is the designated forwarder for the ES 1 and ES 2.

Assume that PE 1 is the egress PE for BUM packets. PE 1 advertises an IMET route that includes a label for one or more ingress PEs to insert so that the egress PE may use the label to flood the BUM packets to CEs coupled to the egress PE. The label value is usually the same for the IMET routes advertised to all other PEs.

A BUM identifier (or BUM label) is an integer value that may be advertised in a MPLS label field in a P-Multicast Service Interface (PMSI) Tunnel attribute of the IMET route. The MPLS label field is also referred to as a VNI field in some embodiments such as VXLAN/NVGRE based EVPN.

As explained at reference 152, the same BUM identifier (BUM 0 at reference 112) is to be advertised to all the PEs of an EVPN instance, regardless of the Ethernet segment allocation. The PEs receiving the BUM identifier may use it for encapsulating the BUM packets that they receive from CEs.

Reference 122 shows BUM packet encapsulation in an ESI label based approach. The ESI label based approach applies to a Multiprotocol Label Switching (MPLS) based EVPN, e.g., MPLS over a protocol such as UDP (MPLSoUDP) (sometimes broadly referred to as MPLSoX as other protocols may also be encapsulated). A BUM packet received from a CE (e.g., CE 4 at reference 108 or CE 1 at reference 102) at an ingress PE (e.g., PE 4 at reference 118 and PE 3 at reference 116, respectively) is encapsulated as an Ethernet payload 138 and transmitted through an MPLS tunnel. Header fields are added to the BUM packet, including a tunnel header 132 that contains tunneling information for MPLSoX and the BUM identifier that is advertised from the egress PE (e.g., PE 1 at reference 112) to the ingress PE. The BUM identifier may be included in a label field to identify the EVI (at reference 134) to which the BUM packet belongs. Yet the advertised BUM identifier is the same for all the IMET routes to the advertising PE, and it does not differentiate BUM packets received from a PE that is in the same ES as the advertising PE. Thus, the BUM identifier by itself can't prevent the BUM packet from being looped when the BUM packet is transmitted to multi-homing CEs.

A BUM packet that is originated from a non-DF PE is encapsulated with a label corresponding to the source Ethernet Segment (referred to as an ESI label) 136 to the BUM packet header. For example, if a BUM packet is transmitted from CE 1 to the ingress PE 3, PE 3 will insert an ESI label, (an integer value such as ESI label 1001, note that label values 0-15 are reserved) that maps to ES 1. The BUM packet will be flooded to other PEs of the EVPN instance including PE 1, which determines that (1) the EVI label shows that the BUM packet belongs to the EVPN instance including PE 1 and PE 4 but (2) the ESI label shows that the BUM packet is sourced from the same ES as PE 1. PE 1 will drop the BUM packet to CE 1 and avoid looping the BUM packet.

Similarly, reference 124 shows the BUM packet encapsulation in a local-bias based approach. The local-bias based approach applies to a VXLAN and/or NVGRE based EVPN. A BUM packet received from a CE (e.g., CE 4 at reference 108) at an ingress PE (e.g., PE 4 at reference 118) is encapsulated as an Ethernet payload 148 and transmitted through an NVO tunnel. Header fields are added to the BUM packet, including an IP header 142 that contains the NVO tunnel source IP address 143 (an IP address of the ingress PE) and the BUM identifier that is advertised from the egress PE (e.g., PE 1 at reference 112) to the ingress PE. The BUM identifier advertised from the egress PE to the ingress PE is encapsulated within VXLAN field 144. The BUM identifier may be included within a VXLAN field to identify the VNI (at reference 145) to which the BUM packet belongs.

The BUM packet after encapsulation at the ingress PE is flooded to other PEs of the EVPN instance including egress PE 1, which determines that (1) the VNI shows that the BUM packet belongs to the same VXLAN instance including PE 1 and PE 4 and (2) the source IP address shows that the BUM packet is from an ingress PE that does not share any ES with egress PE 1. The BUM packet from PE 4 will be flooded by PE 1 to CEs 1 to 3. Yet when the BUM packet is transmitted from CE 1 to the ingress PE 3, which floods to other PEs of the EVPN instance including PE 1, which determines that (1) the VNI shows that the BUM packet belongs to the same VXLAN instance including PE 1 and PE 4 but (2) the source IP address shows that the BUM packet is from an ingress PE that shares one or more ESs with egress PE 1, the BUM packet is not flooded to the one or more ESs (ES 1 in this example) shared with the ingress PE.

In both ESI label based approach and local-bias based approach, two fields of the encapsulated BUM packet need to be examined at the egress PE to make BUM packet flooding determination. In the former case, the ingress PE additionally needs to identify an ESI label and insert it into the header of the BUM packets. These dual field based BUM packet flooding approaches are generally not supported by existing network processors/chipsets for the forwarding plane; thus, existing network processors/chipsets have difficulty supporting EVPN multi-homing, where BUM packet flooding is a key feature. Replacing these network processors/chipsets for EVPN multi-homing support is expensive and even impractical in some cases.

Single Field Based BUM Packet Flooding

Figure 2:
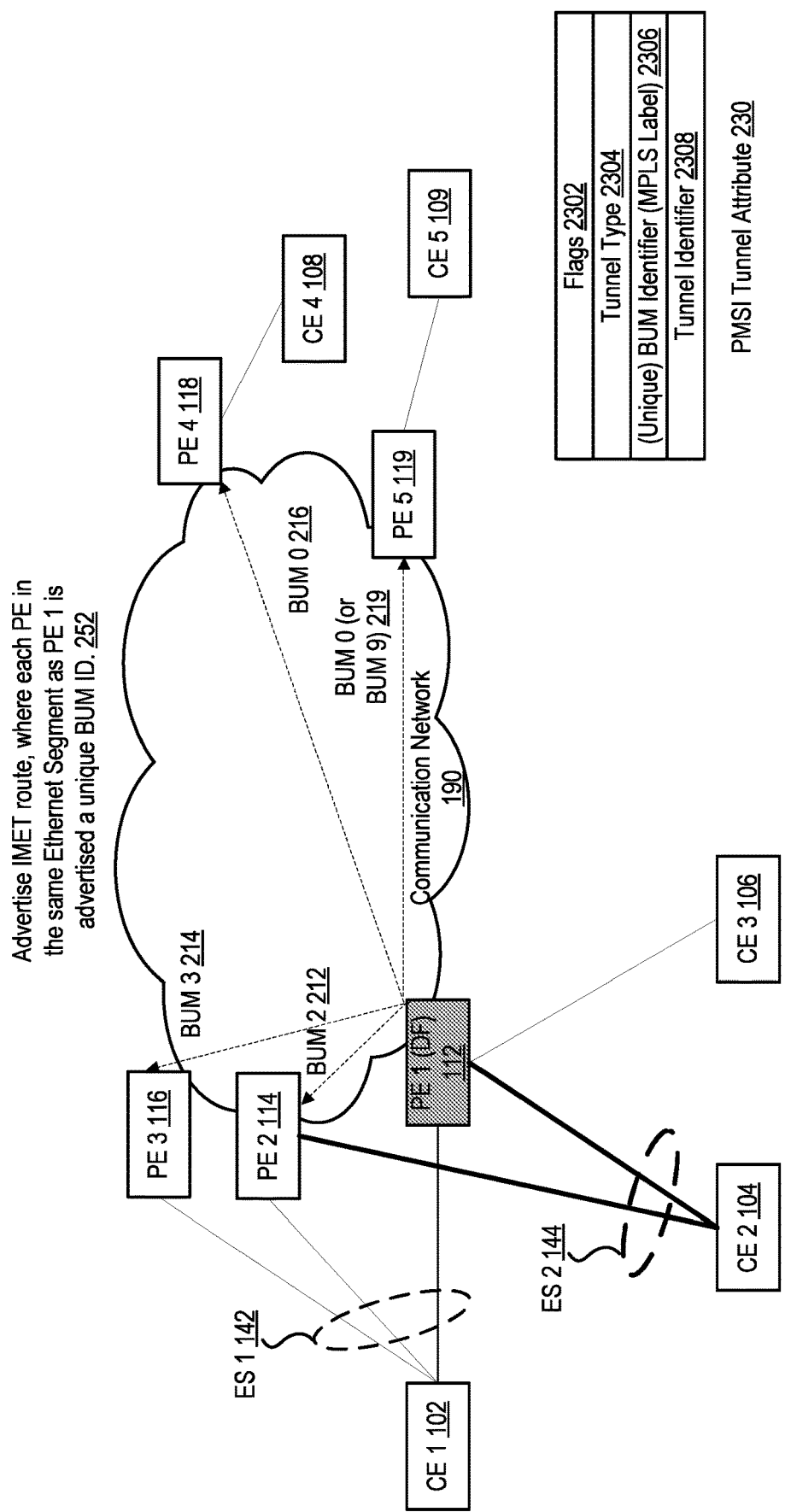
FIG. 2 shows Inclusive Multicast Ethernet Tag (IMET) route advertisement according to some embodiments of the invention.

To overcome the deficiency of the existing approaches to support EVPN multi-homing, embodiments of the invention use a single BUM identifier for BUM packet forwarding. FIG. 2 shows Inclusive Multicast Ethernet Tag (IMET) route advertisement according to some embodiments of the invention. Instead of advertising the same BUM identifier, a PE advertises a unique value (BUM identifier) in the IMET routes to each PE that shares an Ethernet segment (ES) with the advertising PE. The entities in FIG. 2 are similar to the ones in FIG. 1, but PE 1 advertises a unique BUM identifier to each PE that shares an Ethernet segment (ES) with PE 1 as explained at reference 252.

Note that the uniqueness of a BUM identifier is from the point view of an egress PE (which may or may not be the network entity allocating and distributing the BUM identifier as another network entity such as a network controller may allocate and/or distribute the BUM identifier), and an ingress PE may receive the same BUM identifier from different egress PEs. In other words, the egress PE uses the uniqueness of the BUM identifiers to distinguish a first set of BUM packets, which are from one of its multi-homed peer PEs (ones sharing one or more ESs with the egress PE), from a second set of BUM packets, which are from other PEs that are not its multi-homed peer PEs.

Each BUM identifier is an integer value that may be advertised in a MPLS label field in a P-Multicast Service Interface (PMSI) tunnel attribute 230 of the IMET route in one embodiment. The fields of PMSI tunnel attribute 230 also include flags 2302, tunnel type 2304, and tunnel identifier 2308, all of which are defined in the IETF RFC 6514, entitled "BGP Encodings and Procedures for Multicast in MPLS/BGP IP VPNs" and dated February 2012.

In FIG. 2, PE 1 and PE 2 share ES 2, and PE 1 to PE 3 share ES 1; thus, PE 1 advertises a unique BUM identifier (BUM 2 at reference 212) to PE 2 and advertises another unique BUM identifier (BUM 3 at reference 214) to PE 3.

For the PEs that do not share an Ethernet segment with the advertising PE 1, PE 1 may advertise the same BUM identifier for all these no-ES-sharing PEs such as BUM 0 at reference 216 and 219 in one embodiment. Yet in an alternative embodiment, PE 1 may advertise a unique BUM identifier to each other PE of the EVPN instance, regardless of whether the receiving PE is at the same ES as the advertising PE. Thus, PE 1 may advertise to PE 5 a unique BUM identifier (BUM 9 as an option at reference 219). The former embodiment has the advantage of less BUM identifiers to be processed and stored at the egress PE and may be advisable when many PEs are implemented in the EVPN. Additionally, the former embodiment modifies the standardized approaches in the IETF RFCs 8356 and 7432 only when the IMET routes are to be advertised to a PE that shares an Ethernet segment with the advertising PE; thus, the limited modification to the standardized may be easier to adopt. On the other hand, the latter embodiment may be easier to implement since each IMET route will be allocated a unique BUM identifier without considering Ethernet segment allocation.

While IMET route advertisement is used to allocate BUM identifiers to different PEs in some embodiments, other embodiments may use another type of message for an egress PE to advertise BUM identifiers to ingress PEs. Alternatively, the BUM identifiers may be allocated and/or distributed by a network device other than a PE. For example, a network controller 676 of FIG. 6D or another network management device may allocate and/or distribute the BUM identifiers.

Figure 3:
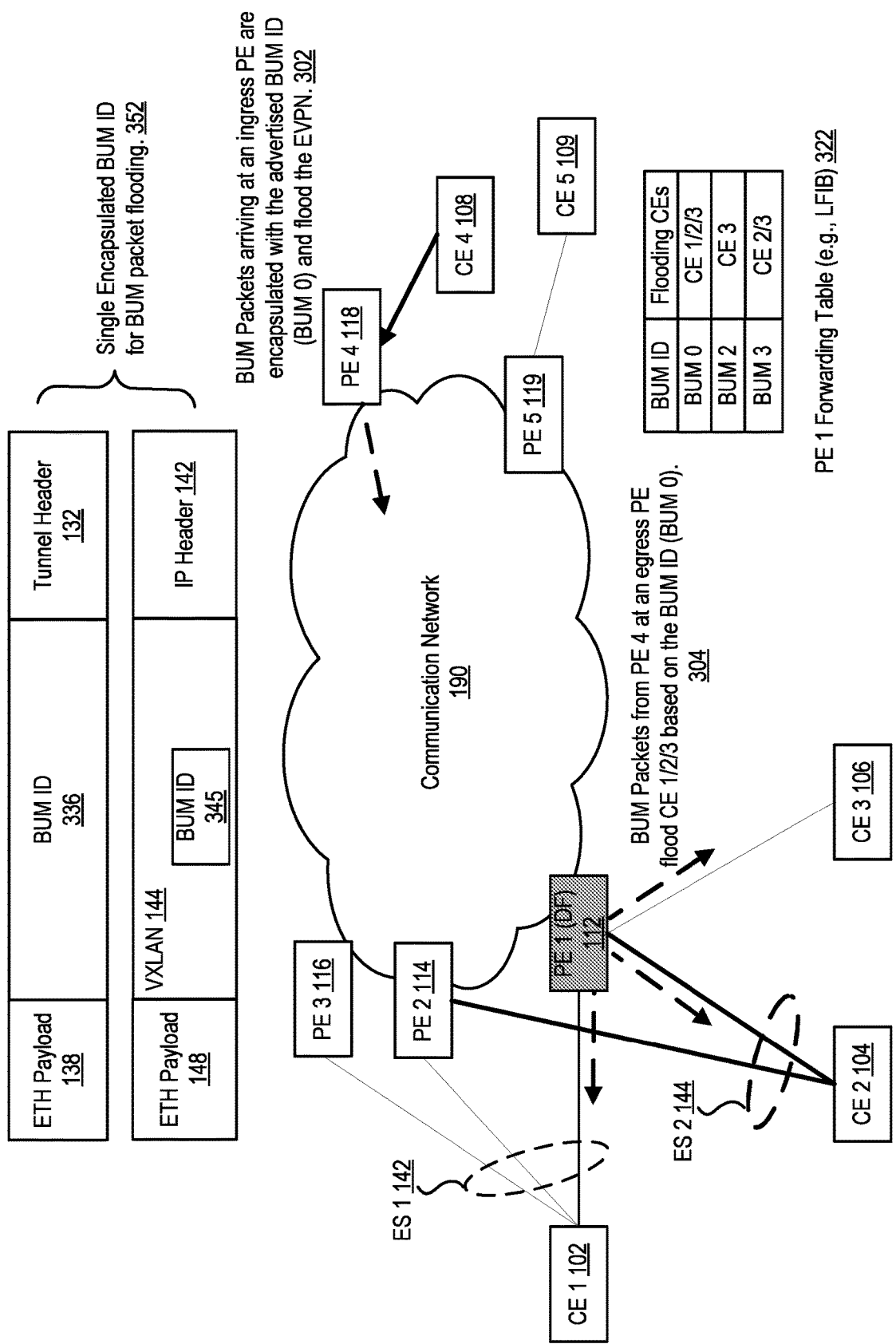
FIG. 3 shows a first example of BUM packet flooding per some embodiments of the invention.

FIG. 3 shows a first example of BUM packet flooding per some embodiments of the invention. A BUM packet of an EVPN instance that includes PE 1 to PE 5 is transmitted from CE 4 at reference 108 to an ingress PE, PE 4 at reference 118, through an attachment circuit (AC). PE 4 encapsulates the unique BUM identifier advertised by PE 1, BUM 0 in this example, in the BUM packet as explained at reference 302. As shown at reference 352, the BUM identifier may be included in a label field (at reference 336) of the BUM packet in the EVPN instance that implements MPLS. Alternatively, the unique BUM identifier may be included in a VNI field (at reference 345) of the BUM packet in the EVPN instance that implements an NVO protocol such as VXLAN and NVGRE.

The ingress PE 4 floods the BUM packet to other PEs of the EVPN instance, and it reaches PE 1. PE 1 builds a forwarding table 322 based on the BUM identifiers it advertises. The forwarding table may be one or more of a Forwarding Information Base (FIB), a Label Information Base (LIB), and a Label Forwarding Information Base (LFIB). The forwarding table 322 specifies, for a given BUM identifier, a set of CEs to which the BUM packet with the BUM identifier (encapsulated as shown at reference 352) is to be flooded. Since the BUM identifier for the BUM packet from PE 4 is BUM 0, the forwarding table entry for BUM 0 indicates that CEs to be flooded are CE 1 to CE 3. At reference 304, PE 1, as the designated forwarder (DF), floods the BUM packet to CE 1 to CE 3. Note that since the BUM packet is sourced from a CE not within a local ES of PE 1, the BUM packet will not be looped back to its sourcing CE.

Figure 4:
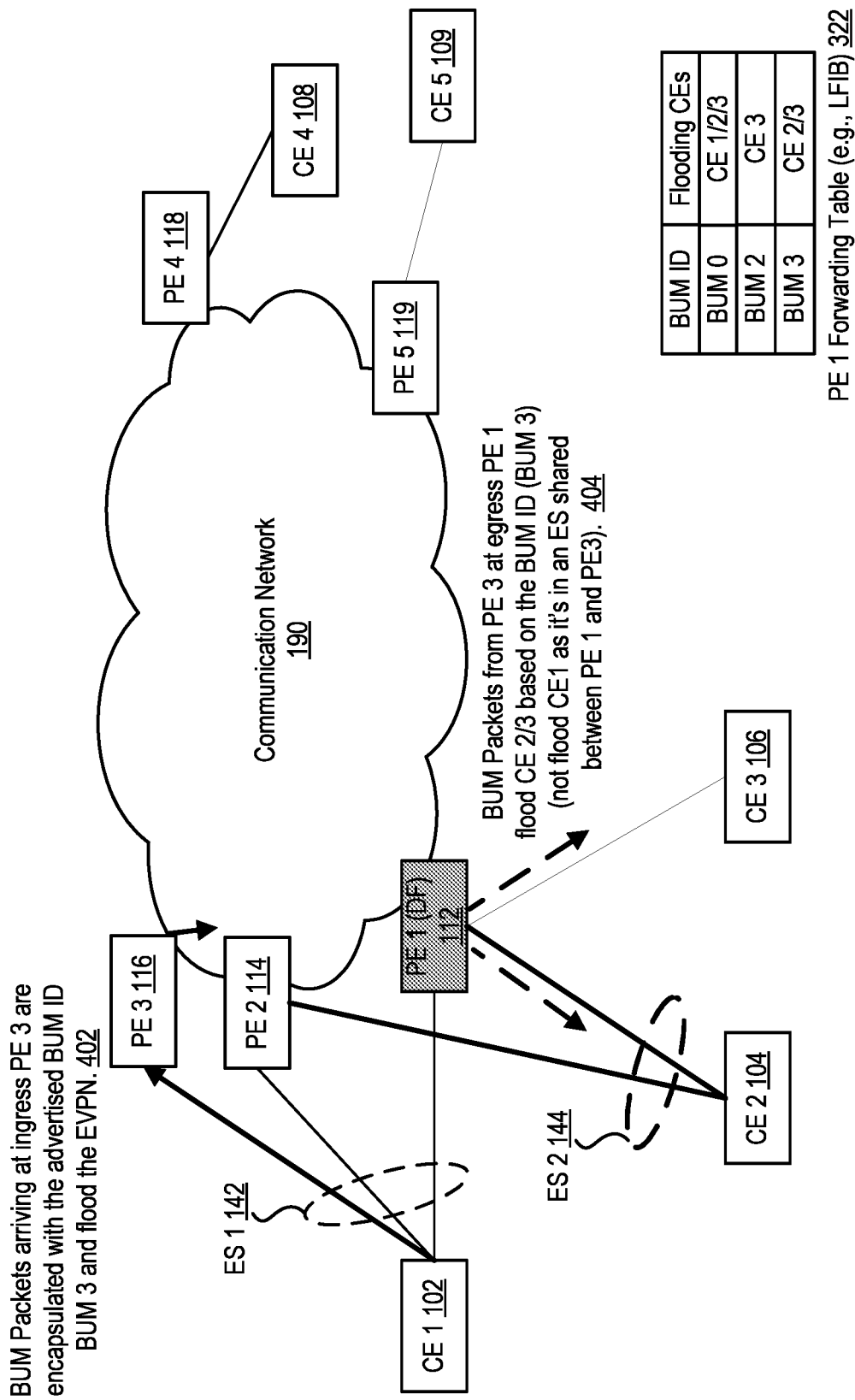
FIG. 4 shows a second example of BUM packet flooding per some embodiments of the invention.

FIG. 4 shows a second example of BUM packet flooding per some embodiments of the invention. The entities in FIGS. 3 and 4 are similar, but the BUM packet in the latter is sourced from CE 1 at reference 102 and transmitted to PE 3 at reference 116 through an attachment circuit (AC). The BUM packet may be transmitted from CE 1 to PE 3 but not to PE 1 in some embodiments (e.g., due to load balancing in multi-homing). In other embodiments, the BUM packet is flooded to all its PEs on the ES 1 at reference 142.

PE 3 encapsulates the unique BUM identifier advertised by PE 1 (BUM 3 as shown in FIG. 2) in the BUM packet as explained at reference 402. The ingress PE 3 floods the BUM packet to other PEs of the EVPN instance, and it reaches PE 1. PE 1 looks up the forwarding table 322 and finds the entry for the unique BUM identifier and floods the BUM packets to the set of CEs indicated by the entry (CEs 2 and 3 as shown in the forwarding table 322). At reference 404, PE 1, as the designated forwarder (DF), floods the BUM packet to CE 2 and CE 3. Note that even though the BUM packet is sourced from a CE within a local ES of PE 1, the BUM packet will not be looped back to the sourcing CE with the implemented unique BUM identifier IMET route advertisement.

Some Embodiments

The operations in the flow diagram will be described with reference to the exemplary embodiments of the other figures. However, it should be understood that the operations of the flow diagram can be performed by embodiments of the invention other than those discussed with reference to the other figures, and the embodiments of the invention discussed with reference to these other figures can perform operations different than those discussed with reference to the flow diagrams.

Figure 5:
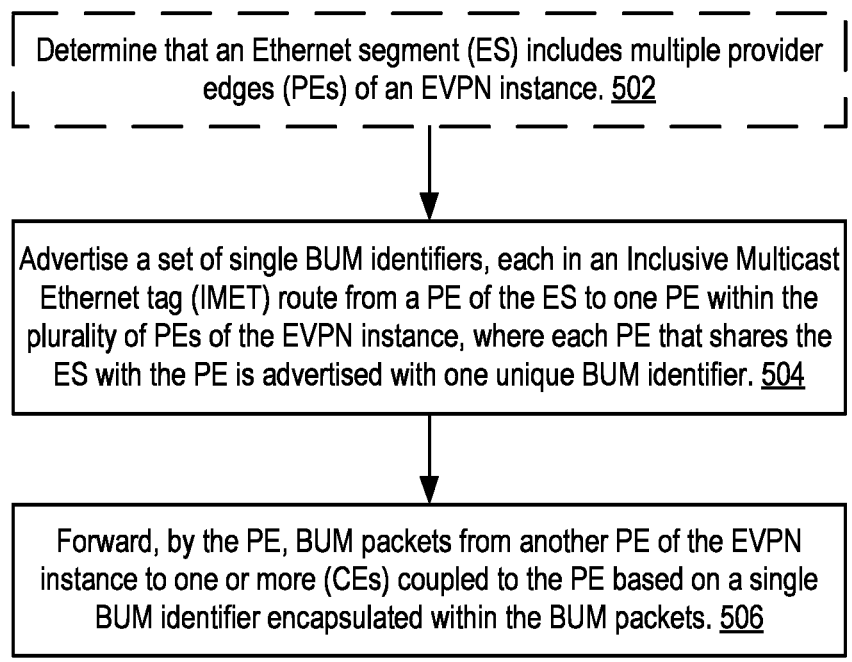
FIG. 5 is a flow diagram illustrating the operations at a provider edge (PE) for split-horizon filtering according to some embodiments of the invention.

FIG. 5 is a flow diagram illustrating the operations at a provider edge (PE) for split-horizon filtering according to some embodiments of the invention. Method 500 may be performed by a PE discussed herein above (e.g., PE 1), which may be implemented in a network device. The PE can be placed in an EVPN of a communication network (e.g., communication network 190). The PE may be within an EVPN instance that includes a plurality of PEs that forward traffic for a plurality of CEs. In some embodiments, the PE is a designated forwarder for the BUM packets.

At reference 502, it can be determined that the PE is within an Ethernet segment (ES) that includes multiple PEs of the EVPN instance. In one embodiment, each PE of the plurality of PEs announces the one or more ESs it has, e.g., using EVPN route type 1. Other PEs compare the received ES identifiers (ESIs) with its locally attached ESs. When a receiving ESI value is the same as a local ESI, the receiving PE determines that it shares the corresponding ES with the announcing PE. Note that when one ES is shared by multiple PEs, the same ESI is configured to all PEs. An ESI is in a 10-octet format, and it may be values such as 00:13:02:03:04:05:06:07:08:09 and 00:13:02:03:04:05:06:07:08:0A (corresponding to the simplified ESIs for ES 1 at reference 142 and ES 2 at reference 144, respectively).

At reference 504, the PE advertises a set of single BUM identifiers, each in an IMET route from the PE to one other PE of the plurality of PEs, where each PE that shares the ES is advertised with one unique BUM identifier. At reference 506, the PE forwards BUM packets from another PE of the EVPN instance to one or more CEs coupled to the PE based on a single BUM identifier encapsulated within the BUM packets.

In some embodiments, the single BUM identifier is advertised in a multi-protocol label switching (MPLS) label field in a P-Multicast Service Interface (PMSI) Tunnel attribute of the IMET route.

In some embodiments, the BUM packets encapsulated with a first unique BUM identifier are from a first PE, and the BUM packets encapsulated with a second unique BUM identifier are from a second PE different from the first PE. Each PE being advertised with a unique BUM identifier is explained above relating to FIG. 2.

In some embodiments, the other PE encapsulates the BUM packets with the single BUM identifier advertised by the PE to the other PE and floods the BUM packets in the EVPN instance. The other PE is an ingress PE such as PE 3 and PE 4 explained relating to FIGS. 3 and 4.

In some embodiments, the PE identifies the single BUM identifier in a label field of the BUM packets in the EVPN instance that implements a MPLS protocol. In alternative embodiments, the PE identifies the single BUM identifier in a VNI field of the BUM packets in the EVPN that implements an NVO protocol. The BUM packets are encapsulated by an ingress PE (the other PE), and the egress PE (the PE of this method) examines the header of the encapsulated BUM packets to determine the single BUM identifier, and the operations are explained relating to reference 352 of FIG. 3.

The embodiments of the invention propose changes on IMET route advertisement. Through embodiments of the invention, a single BUM identifier may be used to flood BUM packets so that EVPN multi-homing can be supported with existing network processors/chipsets for the forwarding plane. Thus, embodiments of the invention reduce hardware/software cost of updating the network processors/chipsets for the forwarding plane and make the support of BUM traffic practical in EVPN.

Network Environments Under Which Embodiments of the Invention May Operate

A network node/device can be a node that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Examples of network nodes also include NodeB, base station (BS), multi-standard radio (MSR) radio node such as MSR BS, eNodeB, gNodeB. MeNB, SeNB, integrated access backhaul (IAB) node, network controller, radio network controller (RNC), base station controller (BSC), relay, donor node controlling relay, base transceiver station (BTS), Central Unit (e.g., in a gNB), Distributed Unit (e.g., in a gNB), Baseband Unit, Centralized Baseband, C-RAN, access point (AP), transmission points, transmission nodes, remote radio unit (RRU), remote radio head (RRH), nodes in distributed antenna system (DAS), core network node (e.g., mobile switching center (MSC), mobile management entity (MME), etc.), operations and maintenance (O&M), operating support system (OSS), self-organizing network (SON), positioning node (e.g., evolved serving mobile location center (E-SMLC)), etc.

An end-user device can also be a node, and the end-user device is a non-limiting term and refers to any type of wireless and wireline device communicating with a network node and/or with another UE in a cellular/mobile/wireline communication system. Examples of end-user device are target device, device to device (D2D) user equipment (UE), vehicular to vehicular (V2V), machine type communication (MTC) UE or UE capable of machine to machine (M2M) communication, personal digital assistance (PDA), Tablet, mobile terminals, smart phone, laptop embedded equipment (LEE), laptop mounted equipment (LME), Internet-of-Things (IoTs) electronic devices, USB dongles, etc.

A node may be an endpoint node of a traffic flow (also simply referred to as "flow") or an intermediate node (also referred to as an on-path node) of the traffic flow. The endpoint node of the traffic flow may be a source or destination node (or sender and receiver node, respectively) of the traffic flow, which is routed from the source node, passing through the intermediate node, and to the destination node. A flow may be defined as a set of packets whose headers match a given pattern of bits. A flow may be identified by a set of attributes embedded to one or more packets of the flow. An exemplary set of attributes includes a 5-tuple (source and destination IP addresses, a protocol type, source and destination TCP/UDP ports).

A node comprises an electronic device. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals-such as carrier waves, infrared signals). Thus, an electronic device (e.g., a computer) includes hardware and software, such as a set of one or more processors (e.g., of which a processor is a microprocessor, controller, microcontroller, central processing unit, digital signal processor, application specific integrated circuit (ASIC), field programmable gate array (FPGA), other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed). When the electronic device is turned on, that part of the code that is to be executed by the processor(s) of the electronic device is typically copied from the slower non-volatile memory into volatile memory (e.g., dynamic random-access memory (DRAM), static random-access memory (SRAM)) of the electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of (1) receiving data from other electronic devices over a wireless connection and/or (2) sending data out to other devices through a wireless connection. This radio circuitry may include transmitter(s), receiver(s), and/or transceiver(s) suitable for radiofrequency communication. The radio circuitry may convert digital data into a radio signal having the proper parameters (e.g., frequency, timing, channel, bandwidth, and so forth). The radio signal may then be transmitted through antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate with wire through plugging in a cable to a physical port connected to a NIC. One or more parts of an embodiment of the invention may be implemented using different combinations of software, firmware, and/or hardware.

Figure 6A:
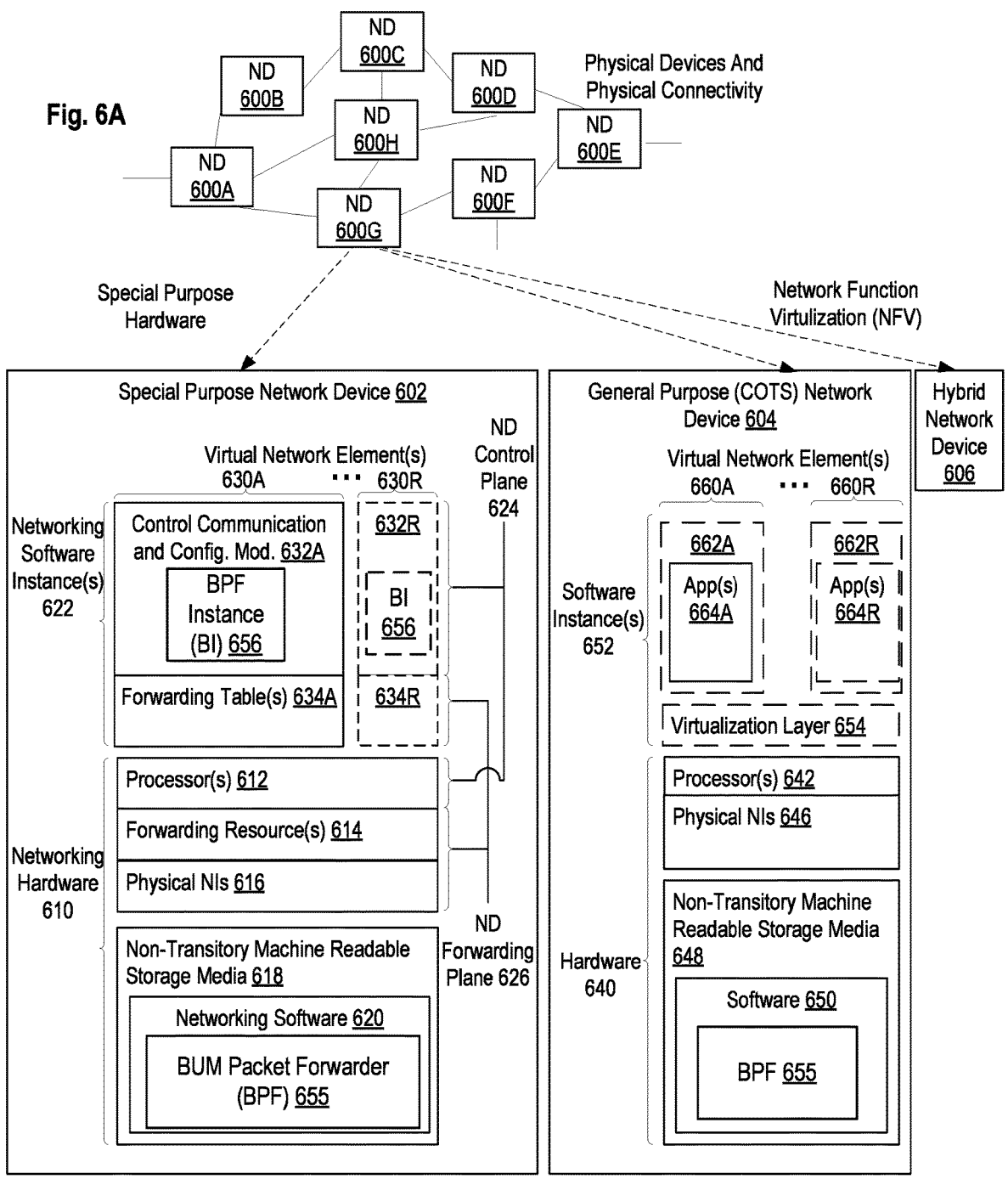
FIG. 6A illustrates connectivity between network devices (NDs) within an exemplary network, as well as three exemplary implementations of the NDs, according to some embodiments of the invention.

FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between 600A-600B, 600B-600C, 600C-600D, 600D-600E, 600E-600F, 600F-600G, and 600A-600G, as well as between 600H and each of 600A, 600C, 600D, and 600G. These NDs are physical devices, and the connectivity between these NDs can be wireless or wired (often referred to as a link). An additional line extending from NDs 600A, 600E, and 600F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application-specific integrated-circuits (ASICs) and a special-purpose operating system (OS); and 2) a general purpose network device 604 that uses common off-the-shelf (COTS) processors and a standard OS.

The special-purpose network device 602 includes networking hardware 610 comprising a set of one or more processor(s) 612, forwarding resource(s) 614 (which typically include one or more ASICs and/or network processors), and physical network interfaces (NIs) 616 (through which network connections are made, such as those shown by the connectivity between NDs 600A-H), as well as non-transitory machine readable storage media 618 having stored therein networking software 620. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A). In one embodiment, the networking software 620 comprises a BUM packet forwarder 655, which performs operations discussed herein above relating to FIGS. 2-5.

The special-purpose network device 602 is often physically and/or logically considered to include: 1) a ND control plane 624 (sometimes referred to as a control plane) comprising the processor(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the processor(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out to the appropriate ones of the physical NIs 616 based on the forwarding table(s) 634A-R.

Figure 6B:
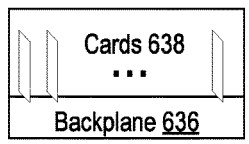
FIG. 6B illustrates an exemplary way to implement a special-purpose network device according to some embodiments of the invention.

FIG. 6B illustrates an exemplary way to implement the special-purpose network device 602 according to some embodiments of the invention. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/ Transport Layer Security (TLS), Intrusion Detection System (IDS), peer-to-peer (P2P), Voice over IP (VOIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general-purpose network device 604 includes hardware 640 comprising a set of one or more processor(s) 642 (which are often COTS processors) and physical NIs 646, as well as non-transitory machine-readable storage media 648 having stored therein software 650. During operation, the processor(s) 642 execute the software 650 to instantiate one or more sets of one or more applications 664A-R. While one embodiment does not implement virtualization, alternative embodiments may use different forms of virtualization. For example, in one such alternative embodiment the virtualization layer 654 represents the kernel of an operating system (or a shim executing on a base operating system) that allows for the creation of multiple instances 662A-R called software containers that may each be used to execute one (or more) of the sets of applications 664A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 654 represents a hypervisor (sometimes referred to as a virtual machine monitor (VMM)) or a hypervisor executing on top of a host operating system, and each of the sets of applications 664A-R is run on top of a guest operating system within an instance 662A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some, or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 640, directly on a hypervisor (in which case the unikernel is sometimes described as running within a LibOS virtual machine), or in a software container, embodiments can be implemented fully with unikernels running directly on a hypervisor represented by virtualization layer 654, unikernels running within software containers represented by instances 662A-R, or as a combination of unikernels and the above-described techniques (e.g., unikernels and virtual machines both run directly on a hypervisor, unikernels and sets of applications that are run in different software containers). Note that the BUM packet forwarder 655 may be instantiated as a BPF 656 as shown in the figure.

The instantiation of the one or more sets of one or more applications 664A-R, as well as virtualization if implemented, are collectively referred to as software instance(s) 652. Each set of applications 664A-R, corresponding virtualization construct (e.g., instance 662A-R) if implemented, and that part of the hardware 640 that executes them (be it hardware dedicated to that execution and/or time slices of hardware temporally shared), forms a separate virtual network element(s) 660A-R.

The virtual network element(s) 660A-R perform similar functionality to the virtual network element(s) 630A-R—e.g., similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high-volume server hardware, physical switches, and physical storage, which could be located in Data centers, NDs, and customer premise equipment (CPE). While embodiments of the invention are illustrated with each instance 662A-R corresponding to one VNE 660A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 662A-R to VNEs also apply to embodiments where such a finer level of granularity and/or unikernels are used.

In certain embodiments, the virtualization layer 654 includes a virtual switch that provides similar forwarding services as a physical Ethernet switch. Specifically, this virtual switch forwards traffic between instances 662A-R and the physical NI(s) 646, as well as optionally between the instances 662A-R; in addition, this virtual switch may enforce network isolation between the VNEs 660A-R that by policy are not permitted to communicate with each other (e.g., by honoring virtual local area networks (VLANs)).

The third exemplary ND implementation in FIG. 6A is a hybrid network device 606, which includes both custom ASICs/special-purpose OS and COTS processors/standard OS in a single ND or a single card within an ND. In certain embodiments of such a hybrid network device, a platform VM (i.e., a VM that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out to the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of an ND), transport protocol (e.g., user datagram protocol (UDP), Transmission Control Protocol (TCP), and differentiated services code point (DSCP)) values.

Figure 6C:
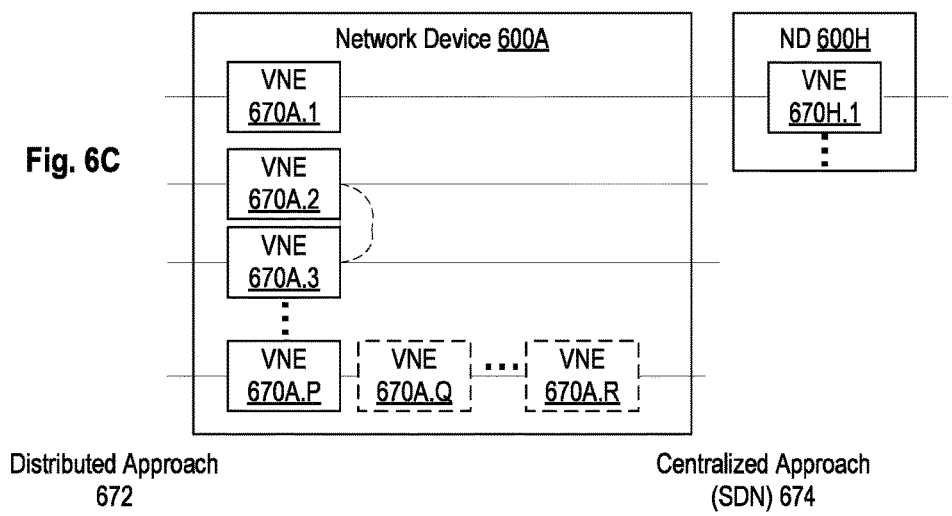
FIG. 6C illustrates various exemplary ways in which virtual network elements (VNEs) may be coupled according to some embodiments of the invention.

FIG. 6C illustrates various exemplary ways in which VNEs may be coupled according to some embodiments of the invention. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service—e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, global positioning system (GPS) units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the software instances 662A-R may operate as servers; the same would be true for the hybrid network device 606; in the case of the special-purpose network device 602, one or more such servers could also be run on a virtualization layer executed by the processor(s) 612); in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A VXLAN Network Identifier is a specific instance of a virtual network on an NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 6D:
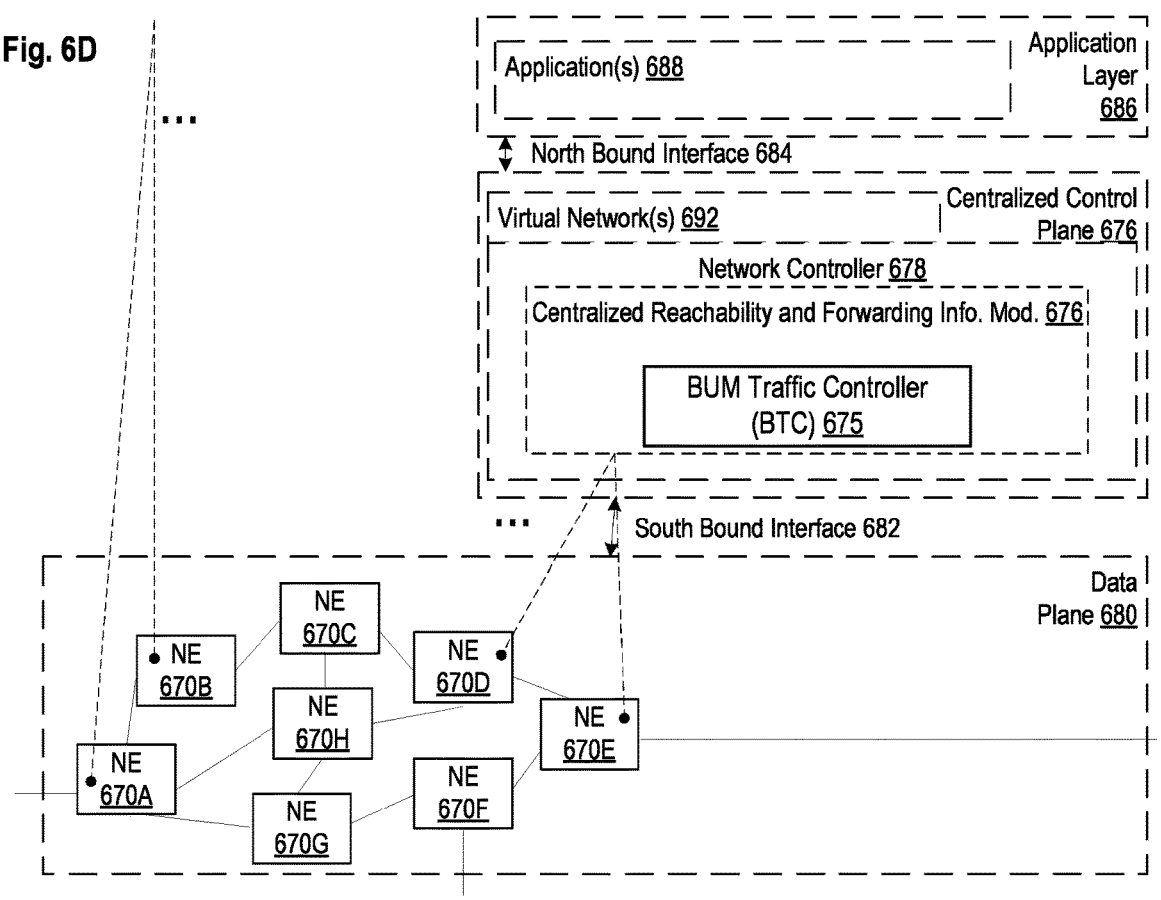
FIG. 6D illustrates a network with a single network element (NE) on each of the NDs, and within this straight forward approach contrasts a traditional distributed approach (commonly used by traditional switches/routers) with a centralized approach for maintaining reachability and forwarding information (also called network control), according to some embodiments of the invention.

FIG. 6D illustrates a network with a single network element on each of the NDs of FIG. 6A, and within this straight forward approach contrasts a traditional distributed approach (commonly used by traditional switches/routers) with a centralized approach for maintaining reachability and forwarding information (also called network control), according to some embodiments of the invention. Specifically, FIG. 6D illustrates network elements (NEs) 670A-H with the same connectivity as the NDs 600A-H of FIG. 6A.

FIG. 6D illustrates that the distributed approach 672 distributes responsibility for generating the reachability and forwarding information across the NEs 670A-H; in other words, the process of neighbor discovery and topology discovery is distributed.

For example, where the special-purpose network device 602 is used, the control communication and configuration module(s) 632A-R of the ND control plane 624 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 670A-H (e.g., the processor(s) 612 executing the control communication and configuration module(s) 632A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 624. The ND control plane 624 programs the ND forwarding plane 626 with information (e.g., adjacency and route information) based on the routing structure(s). For example, the ND control plane 624 programs the adjacency and route information into one or more forwarding table(s) 634A-R (e.g., Forwarding Information Base (FIB), Label Forwarding Information Base (LFIB), and one or more adjacency structures) on the ND forwarding plane 626. For layer 2 forwarding, the ND can store one or more bridging tables that are used to forward data based on the layer 2 information in that data. While the above example uses the special-purpose network device 602, the same distributed approach 672 can be implemented on the general-purpose network device 604 and the hybrid network device 606.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as an SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometimes referred to as the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682 (which may use the OpenFlow protocol). Thus, the network intelligence is centralized in the centralized control plane 676 executing on electronic devices that are typically separate from the NDs. In one embodiment, centralized reachability and forwarding information module 679 includes a BUM traffic controller 675, which may coordinate the BUM traffic forwarding discussed herein above. For example, the BUM traffic controller 675 may determine which PEs share the same Ethernet segments, and how unique BUM identifiers are distributed by a PE.

For example, where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the processor(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-R, in addition to communicating with the centralized control plane 676, may also play some role in determining reachability and/or calculating forwarding information-albeit less so than in the case of a distributed approach; such embodiments are generally considered to fall under the centralized approach 674, but may also be considered a hybrid approach).

While the above example uses the special-purpose network device 602, the same centralized approach 674 can be implemented with the general purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 660A-R, in addition to communicating with the centralized control plane 676, may also play some role in determining reachability and/or calculating forwarding information-albeit less so than in the case of a distributed approach) and the hybrid network device 606. In fact, the use of SDN techniques can enhance the NFV techniques typically used in the general purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 6D shows the distributed approach 672 separate from the centralized approach 674, the effort of network control may be distributed differently or the two combined in certain embodiments of the invention. For example: 1) embodiments may generally use the centralized approach (SDN) 674, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 674 but may also be considered a hybrid approach.

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively, or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

Figure 6E:
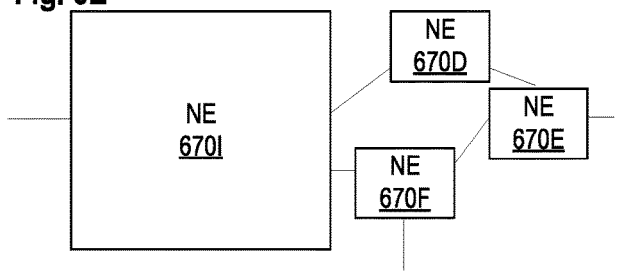
FIG. 6E illustrates the simple case of where each of the NDs implements a single NE, but a centralized control plane has abstracted multiple of the NEs in different NDs into (to represent) a single NE in one of the virtual network(s), according to some embodiments of the invention.
Figure 6F:
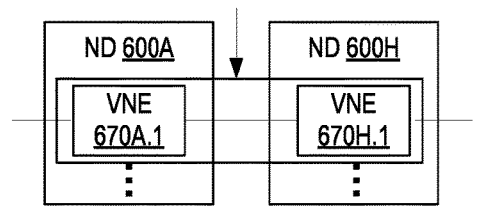
FIG. 6F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 670I in one of the virtual network(s) 692 of FIG. 6D, according to some embodiments of the invention. FIG. 6E shows that in this virtual network, the NE 670I is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention. Thus, the abstraction of an NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Similar to the network device implementations, the electronic device(s) running the centralized control plane 676, and thus the network controller 678 including the centralized reachability and forwarding information module 679, may be implemented in a variety of ways (e.g., a special purpose device, a general-purpose (e.g., COTS) device, or hybrid device). These electronic device(s) would similarly include processor(s), a set of one or more physical NIs, and a non-transitory machine-readable storage medium having stored thereon the centralized control plane software.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 680, the packet (or a subset of the packet header and content) is typically forwarded to the centralized control plane 676. The centralized control plane 676 will then program forwarding table entries into the data plane 680 to accommodate packets belonging to the flow of the unknown packet. Once a specific forwarding table entry has been programmed into the data plane 680 by the centralized control plane 676, the next packet with matching credentials will match that forwarding table entry and take the set of actions associated with that matched entry.

A network interface (NI) may be physical or virtual; and in the context of IP, an interface address is an IP address assigned to an NI, be it a physical NI or virtual NI. A virtual NI may be associated with a physical NI, with another virtual interface, or stand on its own (e.g., a loopback interface, a point-to-point protocol interface). An NI (physical or virtual) may be numbered (an NI with an IP address) or unnumbered (an NI without an IP address). A loopback interface (and its loopback address) is a specific type of virtual NI (and IP address) of an NE/VNE (physical or virtual) often used for management purposes; where such an IP address is referred to as the nodal loopback address. The IP address(es) assigned to the NI(s) of an ND are referred to as IP addresses of that ND; at a more granular level, the IP address(es) assigned to NI(s) assigned to an NE/VNE implemented on an ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding, and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, or else the TCP logic will interpret the out of order delivery as congestion and slow the TCP transfer rate down.

A Layer 3 (L3) Link Aggregation (LAG) link is a link directly connecting two NDs with multiple IP-addressed link paths (each link path is assigned a different IP address), and a load distribution decision across these different link paths is performed at the ND forwarding plane; in which case, a load distribution decision is made between the link paths.

Some NDs include functionality for authentication, authorization, and accounting (AAA) protocols (e.g., RADIUS (Remote Authentication Dial-In User Service), Diameter, and/or TACACS+ (Terminal Access Controller Access Control System Plus). AAA can be provided through a client/server model, where the AAA client is implemented on an ND and the AAA server can be implemented either locally on the ND or on a remote electronic device coupled with the ND. Authentication is the process of identifying and verifying a subscriber. For instance, a subscriber might be identified by a combination of a username and a password or through a unique key. Authorization determines what a subscriber can do after being authenticated, such as gaining access to certain electronic device information resources (e.g., through the use of access control policies). Accounting is recording user activity. By way of a summary example, end user devices may be coupled (e.g., through an access network) through an edge ND (supporting AAA processing) coupled to core NDs coupled to electronic devices implementing servers of service/content providers. AAA processing is performed to identify for a subscriber the subscriber record stored in the AAA server for that subscriber. A subscriber record includes a set of attributes (e.g., subscriber name, password, authentication information, access control information, rate-limiting information, policing information) used during processing of that subscriber's traffic.

Certain NDs (e.g., certain edge NDs) internally represent end user devices (or sometimes customer premise equipment (CPE) such as a residential gateway (e.g., a router, modem)) using subscriber circuits. A subscriber circuit uniquely identifies within the ND a subscriber session and typically exists for the lifetime of the session. Thus, an ND typically allocates a subscriber circuit when the subscriber connects to that ND, and correspondingly de-allocates that subscriber circuit when that subscriber disconnects. Each subscriber session represents a distinguishable flow of packets communicated between the ND and an end user device (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, or ATM). A subscriber session can be initiated using a variety of mechanisms (e.g., manual provisioning a dynamic host configuration protocol (DHCP), DHCP/client-less internet protocol service (CLIPS) or Media Access Control (MAC) address tracking). For example, the point-to-point protocol (PPP) is commonly used for digital subscriber line (DSL) services and requires installation of a PPP client that enables the subscriber to enter a username and a password, which in turn may be used to select a subscriber record. When DHCP is used (e.g., for cable modem services), a username typically is not provided; but in such situations other information (e.g., information that includes the MAC address of the hardware in the end user device (or CPE)) is provided. The use of DHCP and CLIPS on the ND captures the MAC addresses and uses these addresses to distinguish subscribers and access their subscriber records.

A virtual circuit (VC), synonymous with virtual connection and virtual channel, is a connection-oriented communication service that is delivered by means of packet mode communication. Virtual circuit communication resembles circuit switching, since both are connection oriented, meaning that in both cases data is delivered in correct order, and signaling overhead is required during a connection establishment phase. Virtual circuits may exist at different layers. For example, at layer 4, a connection-oriented transport layer datalink protocol such as Transmission Control Protocol (TCP) may rely on a connectionless packet switching network layer protocol such as IP, where different packets may be routed over different paths, and thus be delivered out of order. Where a reliable virtual circuit is established with TCP on top of the underlying unreliable and connectionless IP protocol, the virtual circuit is identified by the source and destination network socket address pair, i.e., the sender and receiver IP address and port number. However, a virtual circuit is possible since TCP includes segment numbering and reordering on the receiver side to prevent out-of-order delivery. Virtual circuits are also possible at Layer 3 (network layer) and Layer 2 (datalink layer); such virtual circuit protocols are based on connection-oriented packet switching, meaning that data is always delivered along the same network path, i.e., through the same NEs/VNEs. In such protocols, the packets are not routed individually and complete addressing information is not provided in the header of each data packet; only a small virtual channel identifier (VCI) is required in each packet; and routing information is transferred to the NEs/VNEs during the connection establishment phase; switching only involves looking up the virtual channel identifier in a table rather than analyzing a complete address. Examples of network layer and datalink layer virtual circuit protocols, where data always is delivered over the same path: X.25, where the VC is identified by a virtual channel identifier (VCI); Frame relay, where the VC is identified by a VCI; Asynchronous Transfer Mode (ATM), where the circuit is identified by a virtual path identifier (VPI) and virtual channel identifier (VCI) pair; General Packet Radio Service (GPRS); and Multiprotocol label switching (MPLS), which can be used for IP over virtual circuits (each circuit is identified by a label).

Certain NDs (e.g., certain edge NDs) use a hierarchy of circuits. The leaf nodes of the hierarchy of circuits are subscriber circuits. The subscriber circuits have parent circuits in the hierarchy that typically represent aggregations of multiple subscriber circuits, and thus the network segments and elements used to provide access network connectivity of those end user devices to the ND. These parent circuits may represent physical or logical aggregations of subscriber circuits (e.g., a virtual local area network (VLAN), a permanent virtual circuit (PVC) (e.g., for Asynchronous Transfer Mode (ATM)), a circuit-group, a channel, a pseudo-wire, a physical NI of the ND, and a link aggregation group). A circuit-group is a virtual construct that allows various sets of circuits to be grouped together for configuration purposes, for example, aggregate rate control. A pseudo-wire is an emulation of a layer 2 point-to-point connection-oriented service. A link aggregation group is a virtual construct that merges multiple physical NIs for purposes of bandwidth aggregation and redundancy. Thus, the parent circuits physically or logically encapsulate the subscriber circuits.

Each VNE (e.g., a virtual router, a virtual bridge (which may act as a virtual switch instance in a Virtual Private LAN Service (VPLS)) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

Further Embodiments and Explanation

While embodiments of the invention have been described in relation to the figures above, embodiments of the invention are not limited to the ones described relating to the figures and alternative embodiments could be implemented.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

In the description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein, refers to any positive whole number of items including one item.

Bracketed text and blocks with dashed borders (e.g., large dashes, small dashes, dot-dash, and dots) in the Specification may be used herein to illustrate optional operations that add additional features to embodiments of the invention. However, such notation should not be taken to mean that these are the only options or optional operations, and/or that blocks with solid borders are not optional in certain embodiments of the invention.

What is claimed is:

1. A method for split-horizon filtering in an Ethernet virtual private network (EVPN), wherein an EVPN instance includes a plurality of provider edges (PEs) that forward traffic for a plurality of customer edges (CEs), the method comprising:
   advertising a set of single Broadcast, Unknown unicast, or Multicast (BUM) identifiers, each in one Inclusive Multicast Ethernet Tag (IMET) route from an advertising PE of the EVPN instance to another PE of the EVPN instance, wherein one other PE that shares an Ethernet segment with the advertising PE is advertised with a single unique BUM identifier to distinguish BUM packets from the one other PE with BUM packets from other PEs of the EVPN instance; and
   forwarding BUM packets by the advertising PE based on the set of single BUM identifiers encapsulated within the BUM packets.

2. The method of claim 1, further comprising:
   determining that the advertising PE and the one other PE share the Ethernet segment.

3. The method of claim 2, wherein the single unique BUM identifier is advertised in a multi-protocol label switching (MPLS) label field in a P-Multicast Service Interface (PMSI) Tunnel attribute of an IMET route.

4. The method of claim 1, wherein the advertising PE is a designated forwarder to forward BUM packets to one or more CEs coupled to the advertising PE.

5. The method of claim 1, wherein BUM packets encapsulated with a first unique BUM identifier are from a first PE, and wherein BUM packets encapsulated with a second unique BUM identifier are from a second PE not sharing an Ethernet segment with the first PE.

6. The method of claim 1, wherein the one other PE encapsulates the BUM packets with the single unique BUM identifier advertised by the advertising PE to the one other PE and floods the BUM packets in the EVPN instance.

7. The method of claim 1, wherein the advertising PE identifies the single unique BUM identifier in a label field of the BUM packets in the EVPN instance that implements a multi-protocol label switching (MPLS) protocol.

8. The method of claim 1, wherein the advertising PE identifies the single unique BUM identifier in a Virtual Extensible Local Area Network (VXLAN) Network Identifier field of the BUM packets in the EVPN instance that implements a network virtualization overlay (NVO) protocol.

9. A network device for performing split-horizon filtering in an Ethernet virtual private network (EVPN), wherein the network device is to serve as a provider edge (PE) of an EVPN instance including a plurality of PEs that forward traffic for a plurality of customer edges (CEs), the network device comprising:
   a processor and a non-transitory machine-readable storage medium to store instructions that, when executed by the processor, cause the network device to perform:
      advertising a set of single Broadcast, Unknown unicast, or Multicast (BUM) identifiers, each in one Inclusive Multicast Ethernet Tag (IMET) route from the network device to another PE of the EVPN instance, wherein one other PE that shares an Ethernet segment with the network device is advertised with a single unique BUM identifier to distinguish BUM packets from the one other PE with BUM packets from other PEs of the EVPN instance; and
      forwarding BUM packets by the network device based on the set of single BUM identifiers encapsulated within the BUM packets.

10. The network device of claim 9, wherein the network device is caused to further perform:
    determining that the network device and the one other PE share the Ethernet segment.

11. The network device of claim 10, wherein the single unique BUM identifier is advertised in a multi-protocol label switching (MPLS) label field in a P-Multicast Service Interface (PMSI) Tunnel attribute of an IMET route.

12. The network device of claim 9, wherein the network device is a designated forwarder to forward BUM packets to one or more CEs coupled to the network device.

13. The network device of claim 9, wherein BUM packets encapsulated with a first unique BUM identifier are from a first PE, and wherein BUM packets encapsulated with a second unique BUM identifier are from a second PE not sharing an Ethernet segment with the first PE.

14. The network device of claim 9, wherein the one other PE encapsulates the BUM packets with the single unique BUM identifier advertised by the network device to the one other PE and floods the BUM packets in the EVPN instance.

15. The network device of claim 9, wherein the network device is to identify the unique single BUM identifier in a label field of the BUM packets in the EVPN instance that implements a multi-protocol label switching (MPLS) protocol.

16. The network device of claim 9, wherein the network device is to identify the single BUM identifier in a Virtual Extensible Local Area Network (VXLAN) Network Identifier field of the BUM packets in the EVPN instance that implements a network virtualization overlay (NVO) protocol.

17. A non-transitory machine-readable storage medium to store instructions for split-horizon filtering in an Ethernet virtual private network (EVPN), wherein when executed by a processor, the instructions to cause a network device to perform:
- advertising a set of single Broadcast, Unknown unicast, or Multicast (BUM) identifiers, each in one Inclusive Multicast Ethernet Tag (IMET) route from the network device to another PE of the EVPN instance, wherein one other PE that shares an Ethernet segment with the network device is advertised with a single unique BUM identifier to distinguish BUM packets from the one other PE with BUM packets from other PEs of the EVPN instance; and
- forwarding BUM packets by the network device based on the set of single BUM identifiers encapsulated within the BUM packets.

18. The non-transitory machine-readable storage medium of claim 17, wherein the instructions when executed by the processor, causing the network device to further perform:
- determining that the network device and the one other PE share the Ethernet segment.

19. The non-transitory machine-readable storage medium of claim 18, wherein the single unique BUM identifier is advertised in a multi-protocol label switching (MPLS) label field in a P-Multicast Service Interface (PMSI) Tunnel attribute of an IMET route.

20. The non-transitory machine-readable storage medium of claim 17, wherein BUM packets encapsulated with a first unique BUM identifier are from a first PE, and wherein BUM packets encapsulated with a second unique BUM identifier are from a second PE not sharing an Ethernet segment with the first PE.

* * * * *